Patented July 4, 1933

1,917,153

UNITED STATES PATENT OFFICE

ALFRED PONGRATZ, OF GRAZ, AUSTRIA, ASSIGNOR TO FELICE BENSA, OF GENOA, ITALY

PROCESS OF MANUFACTURING PERYLENE TETRACARBOXYLIC ACID ANHYDRIDE

No Drawing. Application filed March 1, 1929, Serial No. 343,854, and in Austria April 6, 1928.

A process is known by which vat dye stuffs of the perylene series are obtained by treating diacetyl-dichloro perylene or dipropionyl dichloro perylene with cuprous cyanide in suitable solvents. These dye stuffs which are diacyl-dinitril perylenes are obtained from diacyl-dihalogen perylene having an acyl group and a halogen atom in adjacent peri position with metal cyanides in the presence of organic solvents, such as quinoline or pyridine, separating the product of reaction from the said solvent and removing from this product the metallic constituent of the metal cyanide. Preferably copper cyanide is used and the copper is removed from the reaction product by washing the same with aqueous ammonia. (See United States Patent 1,725,596 dated August 20th, 1929.)

Now the surprising discovery was made that by oxidizing these dye stuffs perylene, tetracarboxylic acid may be obtained with an almost quantitative output.

Example 1

1 part by weight of the dye stuff consisting of diacetyl-dinitril perylene having an acyl group and a nitril group in adjacent peri position and obtained in accordance with Example 1 of the above named application, is firstly finely suspended for instance by treating the same with concentrated sulphuric acid and subsequent precipitating with water. The dye stuff is precipitated in reddish violet flakes. To the suspension of 2.5 parts by weight of a 20% solution of sodium bichromate is added and the reaction is permitted to proceed at a temperature of about 90° centigrade. After 1 to 1½ hours the oxidation is completed and the suspension has now a red colour and is anhydrous perylene tetracarboxylic acid. It is very pure in the raw state already.

By re-precipitating from a dilute aqueous solution of caustic soda and dissolving in boiling nitrobenzene the anhydrous perylene tetracarboxylic acid may be obtained crystallized in small brownish red needles. In dilute aqueous solutions of alkalies the anhydrous acid dissolves with a deep orange brown colour and intense green fluorescence; in concentrated sulphuric acid it dissolves with a reddish violet colour and red fluorescence. In boiling nitrobenzene the anhydrous acid is soluble with an orange color and green fluorescence.

By destructive distillation of the calcium salt perylene is obtained.

The carboxyl groups of the acid are probably in the peri positions of the perylene nucleus.

Example 2

1 part by weight of the same dye stuff as in Example 1, is finely suspended the same as in Example 1 and is caused to flow in 30 minutes at room temperature and under continuous agitation into a solution of 1.5 parts by weight of potassium permanganate in 150 parts by weight of water to which advantageously a little manganous sulphate is added. The product of the reaction is identical with that obtained according to example 1.

Example 3

1 part by weight of the dye stuff, consisting of dipropionyl-dinitril perylene having an acyl and a nitril group in adjacent peri position and obtained as above mentioned, is oxidized by means of potassium permanganate under the same conditions as set forth in Example 2 with the difference however that in the case for the oxidation to anhydrous perylene tetracarboxylic acid 2.5 parts by weight of potassium permanganate are used.

Although the individual reactions of the process are not yet absolutely ascertained, they are most probably those illustrated by the following structural formula:—

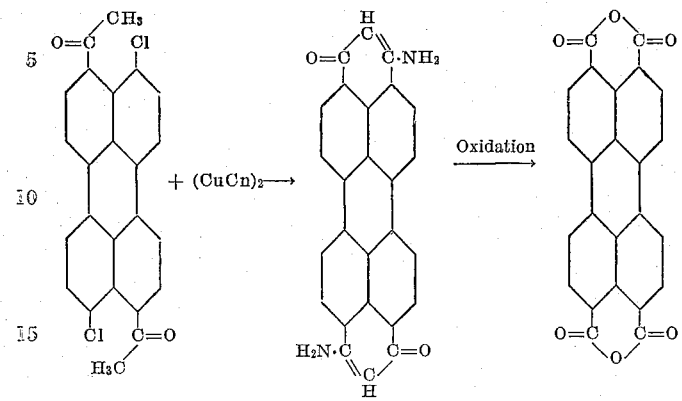

The 3.9-dichloro-4.10 diacetyl-perylene Formula I, is converted by the reaction with copper cyanide and removal of the copper into the intermediate product, Formula II, the $CH_3$ groups being changed into CH groups and being combined the $CNH_2$ groups which have been replaced for the Cl atoms. By the following oxidation with permanganate or bichromate the two $CH=CNH_2$ groups are oxidized to $O-C=O$ groups thus giving perylene tetracarboxylic acid anhydride.

As is seen from the above example bichromates or permanganates are used as the oxidizing agents, that is to say salts of the oxygen acids of the group consisting of manganese and chromium.

What I claim is:

1. A process for manufacturing perylene tetracarboxylic acid anhydride comprising the steps of finely sub-dividing diacyl-dinitril perylene having an acyl group and a nitril group in adjacent peri position and treating it with a salt of an oxygen acid of a group consisting of manganese and chromium capable of forming strongly oxidizing acids, in the presence of sulphuric acid.

2. A process for manufacturing perylene tetracarboxylic acid anhydride comprising the steps of dissolving diacyl-dinitril perylene having an acyl group and a nitril group in adjacent peri positions in sulphuric acid, precipitating the said diacyl-dinitril perylene from the solution by the addition of water and adding to the mixture so formed a salt of an oxygen acid of a group consisting of manganese and chromium capable of forming strongly oxidizing acids.

3. A process for manufacturing perylene tetracarboxylic acid anhydride comprising the steps of dissolving diacyl-dinitril perylene having an acyl group and a nitril group in adjacent peri position in sulphuric acid, precipitating the said diacyl-dinitril perylene from the solution by the addition of water and adding to the mixture so formed an aqueous solution of a permanganate.

4. A process for manufacturing perylene tetracarboxylic acid anhydride comprising the steps of dissolving diacyl-dinitril perylene having an acyl group and a nitril group in adjacent peri position in sulphuric acid, precipitating the said diacyl-dinitril perylene from the solution by the addition of water and adding to the mixture so formed an aqueous solution of a permanganate and manganous sulphate.

In testimony whereof I have affixed my signature.

ALFRED PONGRATZ.